(12) United States Patent
Byers et al.

(10) Patent No.: US 9,138,950 B2
(45) Date of Patent: Sep. 22, 2015

(54) TIRE MOLDING APPARATUS

(75) Inventors: Bo William Byers, Murfreesboro, TN (US); Robert P. Karpinski, Nashville, TN (US); Craig Romans, Uniontown, OH (US); John Dempsey, Suffield, OH (US); Edward Steven Seroka, Akron, OH (US); Larry E. Speck, Akron, OH (US); Joseph A. Labbe, Jr., Silver Lake, OH (US); Phillip Coderre, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 315 days.

(21) Appl. No.: 13/251,319

(22) Filed: Oct. 3, 2011

(65) Prior Publication Data

US 2013/0049254 A1 Feb. 28, 2013

Related U.S. Application Data

(60) Provisional application No. 61/528,797, filed on Aug. 30, 2011.

(51) Int. Cl.
| | |
|---|---|
| *B23P 6/00* | (2006.01) |
| *B29C 35/00* | (2006.01) |
| *B22D 27/02* | (2006.01) |
| *B29D 30/06* | (2006.01) |

(52) U.S. Cl.
CPC ...... *B29D 30/0662* (2013.01); *B29D 2030/063* (2013.01); *B29D 2030/0607* (2013.01); *B29D 2030/0666* (2013.01)

(58) Field of Classification Search
USPC .................. 425/40, 41, 50, 28.1; 249/79; 29/894.36, 402.01, 402.09, 402.14, 29/401.1
See application file for complete search history.

(56) References Cited

U.S. PATENT DOCUMENTS

| | | | | | |
|---|---|---|---|---|---|
| 1,349,688 | A | * | 8/1920 | Nichols | 425/50 |
| 1,917,262 | A | * | 7/1933 | Hawkinson | 425/22 |
| 2,066,265 | A | * | 12/1936 | Freeman | 264/501 |
| 2,729,853 | A | * | 1/1956 | Hawkinson | 425/20 |
| 2,736,060 | A | * | 2/1956 | Glynn | 425/25 |
| 2,932,853 | A | * | 4/1960 | Fike | 425/17 |
| 3,154,814 | A | * | 11/1964 | Fike | 425/25 |
| 3,170,193 | A | * | 2/1965 | Fike | 425/20 |
| 3,910,735 | A | * | 10/1975 | Caretta | 425/46 |
| 4,116,595 | A | * | 9/1978 | Fike et al. | 425/17 |
| 4,401,156 | A | * | 8/1983 | Wojtecki et al. | 165/172 |
| 4,439,876 | A | * | 4/1984 | Chalberg | 4/541.6 |
| 4,446,093 | A | * | 5/1984 | Mattson | 264/315 |

(Continued)

FOREIGN PATENT DOCUMENTS

| | | |
|---|---|---|
| JP | H09-076238 | 3/1997 |
| JP | 2011-126044 | 6/2011 |

OTHER PUBLICATIONS

Jun Eun Jae, International Search Report and Written Opinion, Jan. 23, 2013, pp. 1-9, Korean Intellectual Property Office, Daejeon Metropolitan City, ROK.

(Continued)

*Primary Examiner* — Essama Omgba

(57) ABSTRACT

A tire mold apparatus is provided along with methods of retrofitting a tire mold, such that a tire mold of the type traditionally utilized in a dome type curing press can be modified to have external steam tracings allowing the mold to be utilized in a platen press.

16 Claims, 10 Drawing Sheets

(56) References Cited

U.S. PATENT DOCUMENTS

| | | | |
|---|---|---|---|
| 5,086,836 A * | 2/1992 | Barth et al. ............... 165/164 |
| 5,173,308 A | 12/1992 | Scantland et al. |
| 5,186,951 A * | 2/1993 | Siegenthaler ............. 425/28.1 |
| 5,320,510 A | 6/1994 | Siegenthaler |
| 5,683,643 A | 11/1997 | Laurent |
| 5,799,345 A * | 9/1998 | Hansen et al. ................. 4/584 |
| 5,803,506 A * | 9/1998 | Argersinger et al. ......... 285/14 |
| 6,131,617 A * | 10/2000 | Pitzer et al. ................. 138/143 |
| 6,402,491 B1 | 6/2002 | Goto |
| 6,410,893 B1 * | 6/2002 | Yagnik et al. ............... 219/540 |
| 6,413,068 B1 | 7/2002 | Steidl et al. |
| 6,660,122 B1 | 12/2003 | Prakash et al. |
| 6,682,687 B1 | 1/2004 | Mitamura et al. |
| 6,762,395 B2 * | 7/2004 | Yagnik et al. ............... 219/540 |
| 6,810,916 B2 * | 11/2004 | Thompson ..................... 138/32 |
| 6,841,113 B2 | 1/2005 | Caretta |
| 6,916,164 B2 | 7/2005 | Kasper et al. |
| 7,160,090 B2 | 1/2007 | Yang et al. |
| 7,321,107 B2 * | 1/2008 | Yagnik et al. ............... 219/540 |
| 7,572,120 B2 * | 8/2009 | Ouyahia et al. ............... 425/40 |
| 8,469,082 B2 * | 6/2013 | Perry ............................ 165/185 |
| 8,662,156 B2 * | 3/2014 | Perry ............................ 165/185 |
| 2003/0034344 A1 * | 2/2003 | Yagnik et al. ............... 219/540 |
| 2005/0067403 A1 * | 3/2005 | Yagnik et al. ............... 219/540 |
| 2005/0095308 A1 * | 5/2005 | Yang et al. ..................... 425/40 |
| 2006/0012076 A1 * | 1/2006 | Caretta et al. ............... 264/326 |
| 2006/0037132 A1 * | 2/2006 | Ferguson ...................... 4/541.1 |
| 2008/0277815 A1 | 11/2008 | Kaneda |
| 2009/0115103 A1 | 5/2009 | Ichimaru |
| 2012/0111464 A1 * | 5/2012 | Kimiya ...................... 152/209.1 |

OTHER PUBLICATIONS

Wikipedia "Double-walled pipe" definition, printout from Wikipedia website, 2 pages (undated but admitted to be prior art).

Steam Tracing Specification Guide, Thermon, San Marcos, Texas, 18 pages (undated but admitted to be prior art).

* cited by examiner

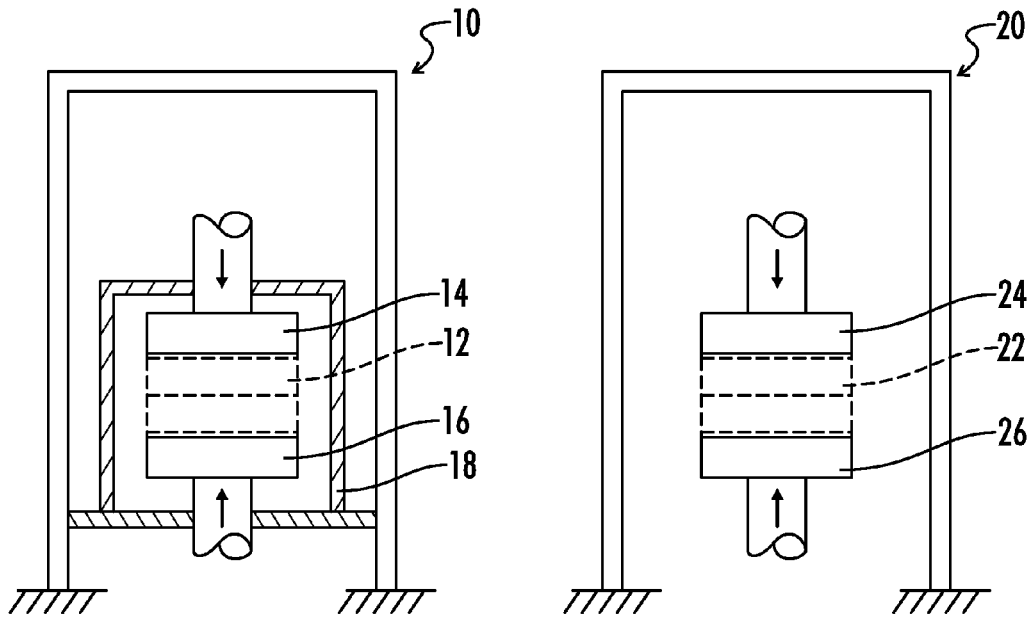
FIG. 1
*(PRIOR ART)*
FIG. 2
*(PRIOR ART)*
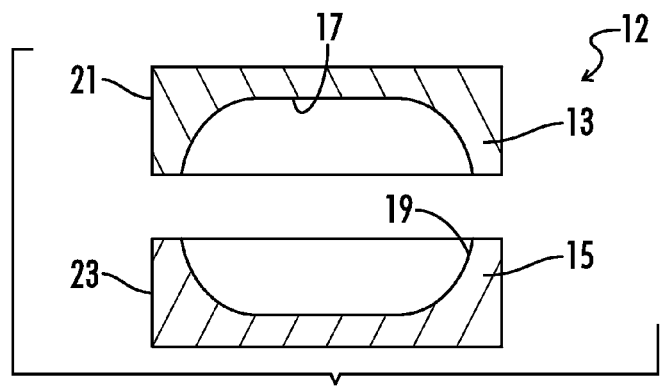
FIG. 3
*(PRIOR ART)*

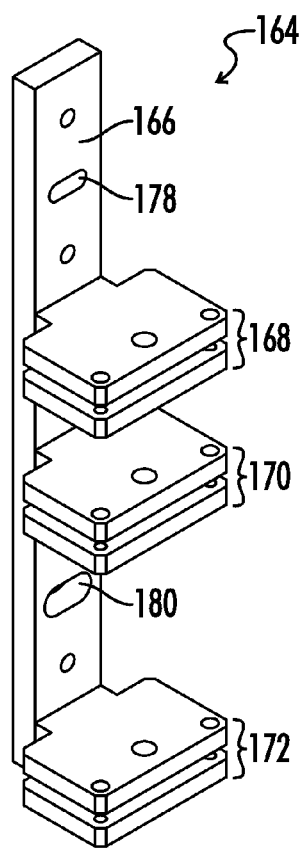
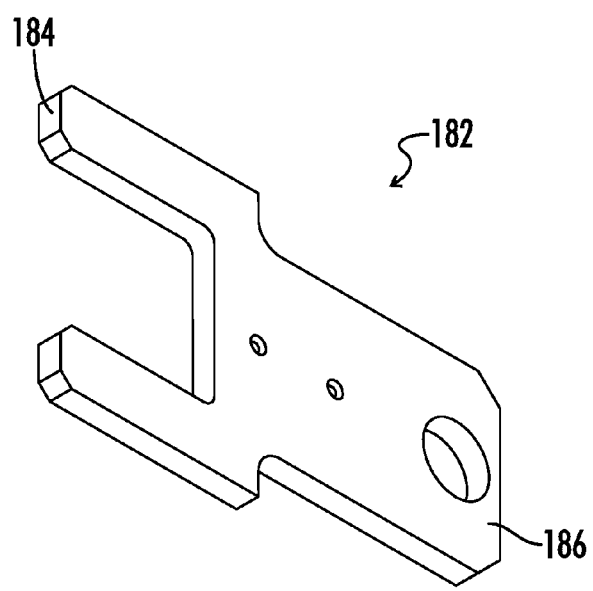
FIG. 11
FIG. 12

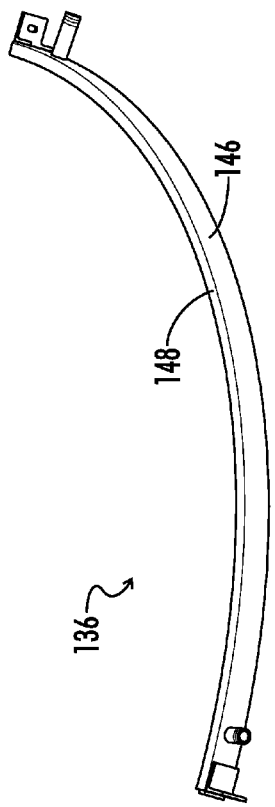
FIG. 13
FIG. 15
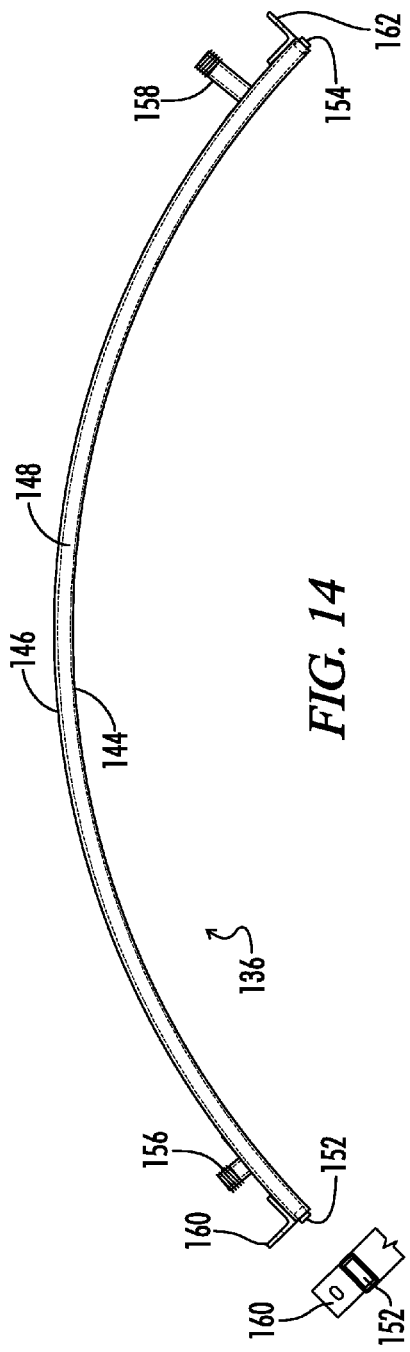
FIG. 14
FIG. 16

TIRE MOLDING APPARATUS

CROSS REFERENCE TO RELATED APPLICATION

This application claims the benefit of U.S. Provisional Patent Application Ser. No. 61/528,797 filed Aug. 30, 2011; the disclosures of which are incorporated herein by reference.

BACKGROUND OF THE INVENTION

1. Field of the Invention

The present invention relates generally to apparatus for molding tires.

2. Description of the Prior Art

During the manufacture of a tire, a tire carcass is built up out of beads, belts and plies, and then the carcass or green tire is placed in a mold in which the rubber exterior surfaces of the tire are shaped and molded. The tire is maintained in the mold under heat and pressure for a sufficient time to cure the rubber so that the tire will maintain its shape upon removal from the mold.

The prior art includes dome type curing presses and platen type curing presses. FIG. 1 is a schematic illustration of a dome type curing press generally designated by the numeral 10. A dome type tire mold 12 indicated in dashed lines is received between upper and lower plates 14 and 16, and is surrounded by a dome 18. The dome 18 is filled with steam during the curing process and thus relatively uniformly heats the entire tire mold 12 which is contained inside the dome within the heated space. Heated water under pressure is applied internally to the green tire to conform it to the various cavities of the tire mold during the curing process.

FIG. 3 schematically illustrates a typical prior art dome type tire mold 12 which has an upper mold half 13 and a lower mold half 15. The mold halves have upper and lower cavities 17 and 19 formed therein, so that when the mold halves are brought together a cavity is defined having the exterior shape of the desired tire. The mold halves 13 and 15 typically have cylindrical outer surfaces such as 21 and 23. As noted with regard to FIG. 1, the heating of the exterior surfaces 21 and 23 of the mold 12 occurs from the steam within the steam dome 18 which surrounds the mold 12.

FIG. 2 schematically illustrates a prior art platen press type of curing press indicated by the numeral 20. In the platen press arrangement of FIG. 2 a platen press type mold 22 is received between upper and lower plates 24 and 26. The upper and lower plates 24 and 26 are heated and thus convey heat to the mold 22 held therebetween during the curing process. There is not, however, any exterior dome to contain steam, and thus there may be no heat source directed to the outer circumferential areas of the platen press type mold 22.

Depending upon the vertical thickness of the mold 22 it may or may not receive sufficient heat directly from the platens 24 and 26 to adequately cure the entire thickness of the tire. Prior art platen press molds having a sufficient vertical height to require additional heating of the central exterior portions of the mold typically are constructed with integral steam heating cavities in the mold 22.

Traditional platen press type molds are often segmented molds which open somewhat like the petals of a flower with each segment having internal heating passages formed therein.

SUMMARY OF THE INVENTION

The present invention is directed to apparatus and methods for permitting a dome type tire mold such as the mold 12 shown in FIGS. 1 and 3 to be used in a platen type press such as the press 20 shown in FIG. 2.

In one embodiment a tire mold apparatus includes a mold body having an upper annular mold half and a lower annular mold half. Each mold half has a cylindrical outer surface. The mold halves are constructed to fit together to define a mold cavity for molding a tire. An upper steam tracing including a plurality of upper loops surrounds the cylindrical outer surface of the upper mold half. The upper steam tracing is detachably mounted on the upper mold half. A lower steam tracing including a plurality of lower loops surrounds the cylindrical outer surface of the lower annular mold half. The lower steam tracing is detachably mounted on the lower annular mold half. This permits the upper and lower annular mold halves to be separated with the steam tracing still attached thereto.

In another embodiment a method is provided for retrofitting a tire mold originally constructed for use in a dome press so that the mold can be used in a platen press. The tire mold includes an upper mold part having an upper cylindrical outer surface and a lower mold part having a lower cylindrical outer surface. The method includes the steps of:

(a) attaching an upper steam tracing to the upper cylindrical outer surface, the upper steam tracing including multiple upper loops extending around the upper cylindrical outer surface; and (b) attaching a lower steam tracing to the lower cylindrical outer surface, the lower steam tracing including multiple lower loops extending around the lower cylindrical outer surface.

Numerous objects features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a schematic elevation view of a prior art dome type curing press.

FIG. 2 is a schematic elevation view of a prior art platen type curing press.

FIG. 3 is a schematic elevation sectioned view of a two piece prior art tire mold for use in a dome type curing press like that of FIG. 1.

FIG. 11 is a perspective view of one of the mounting brackets such as that seen in FIG. 9.

FIG. 12 is a perspective view of a supporting member utilized with the mounting bracket of FIG. 11 to support individual loops of the steam tracing as seen in FIGS. 9 and 10.

FIG. 13 is a perspective view of one arcuate segment of one of the loops of the steam tracings.

FIG. 14 is a plan view of the arcuate segment of FIG. 13.

FIG. 15 is a side elevation view of the arcuate segment of FIG. 14.

FIG. 16 is an end elevation view of the arcuate segment of FIG. 14.

DETAILED DESCRIPTION OF THE INVENTION

Figure 4:
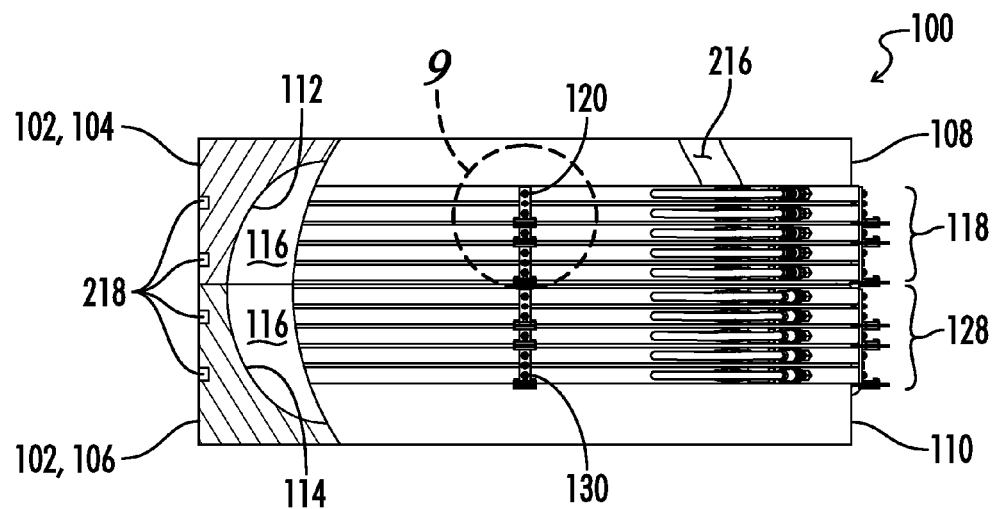
FIG. 4 is an elevation view of a tire mold apparatus of the type originally designed for use in a dome type curing press, which has been modified by the addition of external steam tracings to the upper and lower mold halves to provide external heating upon use of the tire mold in a platen type curing press.

Referring now to FIG. 4, a tire mold apparatus is shown and generally designated by the numeral 100. The tire mold 100 includes a mold body 102 having an upper annular mold half 104 and a lower annular mold half 106. The upper mold half 104 has a cylindrical outer surface 108 and the lower mold half 106 has a cylindrical outer surface 110.

As schematically illustrated on the left hand side of FIG. 4, the upper and lower mold halves 104 and 106 include upper and lower cavities 112 and 114, respectively, which when joined together as shown in FIG. 4 define a cavity 116 having the external shape and configuration of the desired tire. Although the apparatus 100 may be used for molding any size tire, it is particularly useful on very large tires such as agricultural tires where the mold may have a height in the range of 40 to 54 inches, and the tire may have a diameter on the order of 80 inches or more.

As seen in FIG. 4, an upper steam tracing 118 including a plurality of upper loops, in this case five such loops, surrounds the cylindrical outer surface 108 of the upper mold half 104. The upper steam tracing 118 is detachably mounted on the upper mold half 104 by a plurality of bracket assemblies 120, 122, 124 and 126 the locations of which are shown in the plan view of FIG. 5. An enlarged elevation view of the bracket assembly 120 is seen in FIG. 9, and further details are shown in the sectioned view of FIG. 10.

Similarly, a lower steam tracing 128 including a plurality of lower loops surrounds the cylindrical outer surface 110 of the lower annular mold half 106. The lower steam tracing is detachably mounted on the lower annular mold half 106 by a plurality of mounting bracket assemblies such as 130 seen in FIG. 4. The details of construction of all of the mounting bracket assemblies are similar and will be described below with regard to the enlarged views of FIGS. 9 and 10. The upper and lower steam tracings 118 and 128 are separately structurally mounted upon the upper and lower mold halves 104 and 106, respectively, so that when the mold halves 104 and 106 are separated to allow a tire to be placed in the mold or removed from the mold, the mold halves can be moved with their respective steam tracings still attached thereto.

The steam tracings 118 and 128 are each of a modular construction. As noted each steam tracing includes a plurality of loops. For example, the upper steam tracing 118 which is seen in the enlarged views of FIGS. 9 and 10 includes five upper loops 130A, 130B, 130C, 130D and 130E.

Figure 6:
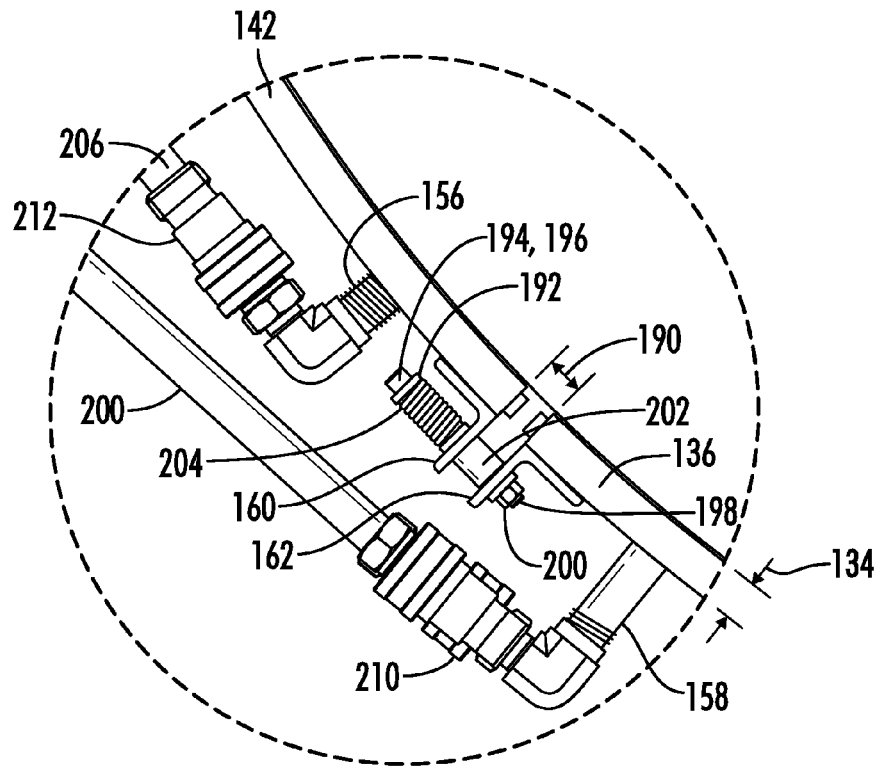
FIG. 6 is an enlarged view of the area circled and indicated as 6 in FIG. 5.
Figure 7:
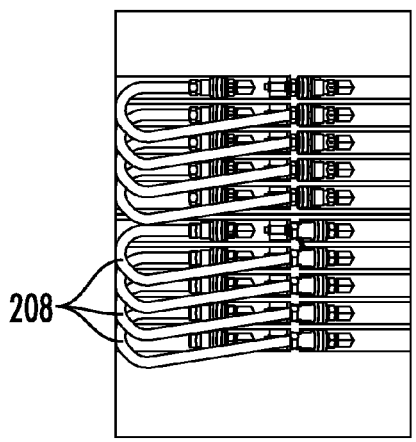
FIG. 7 is a partial elevation view of a portion of the apparatus of FIG. 5 taken along line 7-7 of FIG. 5 and showing the flexible hose connections between adjacent loops of the steam tracings.
Figure 9:
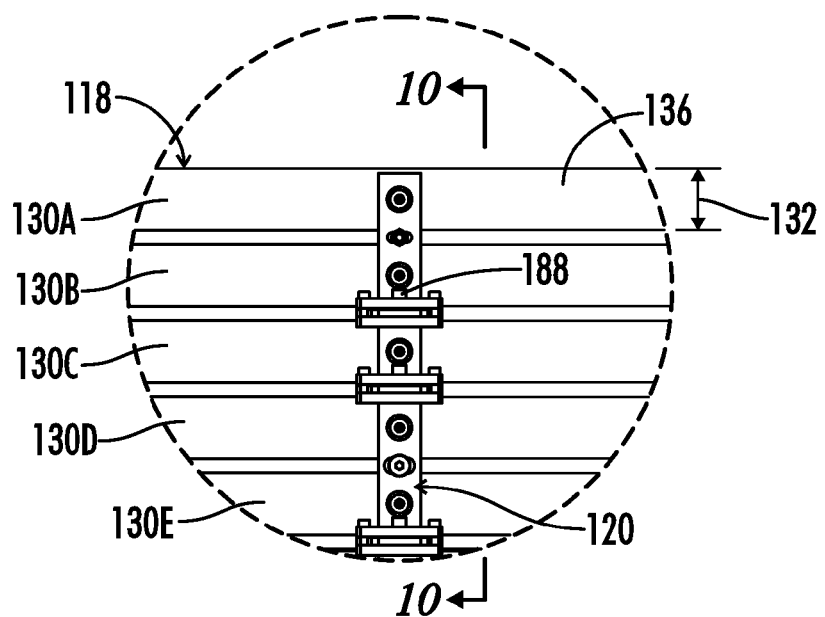
FIG. 9 is an enlarged view of the circled portion indicated by the number 9 in FIG. 4 further showing the details of a mounting bracket for attaching the steam tracings to the tire mold.

In the embodiment illustrated each loop is formed from tubing having a rectangular cross-section, with the rectangular cross-section being defined by a height 132 seen in FIG. 9 and a width 134 seen in FIG. 6.

Figure 5:
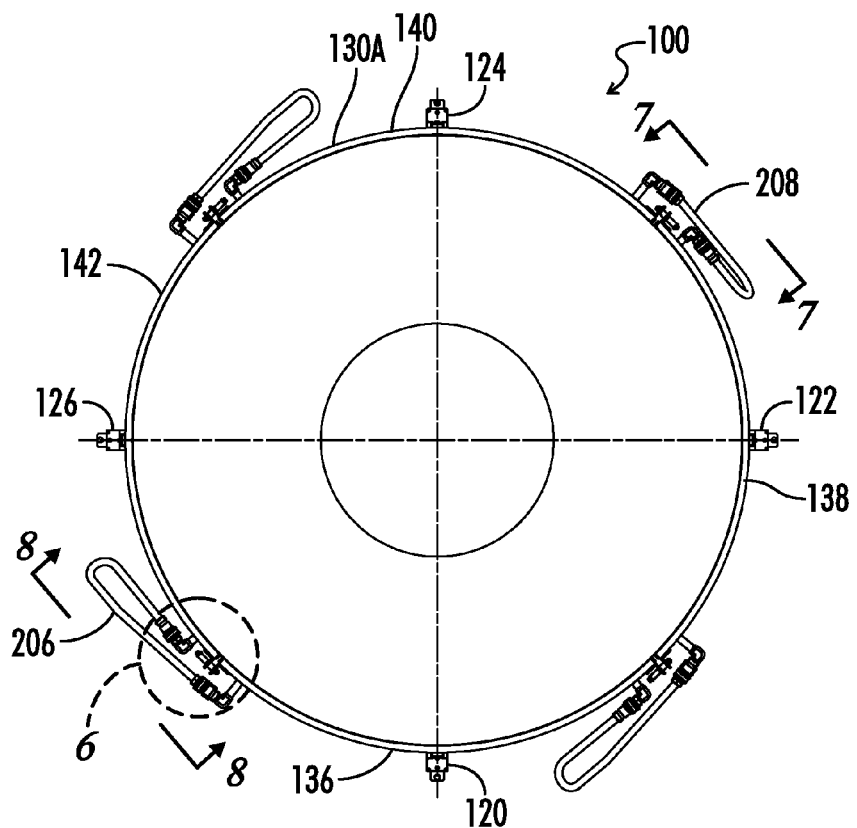
FIG. 5 is a plan view of the tire mold apparatus of FIG. 4.

As best seen in FIG. 5, the first upper loop 130A is made up of a plurality of arcuate segments joined together to form a 360° loop. In the embodiment of FIG. 5, the upper loop 130A includes four substantially 90° arcuate segments 136, 138, 140 and 142. Although the embodiment illustrated includes four substantially equal length arcuate segments each subtending approximately 90° of the loop, other arrangements are possible. For example in the embodiment illustrated in FIGS. 18-19 there are six arcuate segments each subtending approximately 60° of the tracing loop.

The details of construction of one of the arcuate segments such as 136 are shown in FIGS. 13-16. There it is seen that the arcuate segment 136 has been formed into an arc defining a portion of a circle and has been bent along its thickness 134. The arcuate segment 136 can be described as having a radially inner planar surface 144, a radially outer planar surface 146, an upper surface 148, and a lower surface 150. The radially inner planar surface 144 is designed to closely conform to and engage the cylindrical outer surface 108 of upper mold half 104. In the embodiment illustrated the radially inner planar surface 144 directly engages the cylindrical outer surface 108 of the upper annular mold half 104 with no heat transfer media between the tubing and the cylindrical outer surface of the mold. It will be appreciated, however, that in other embodiments a heat transfer media can be placed between the tubing and the outer surface of the mold. For example, in the embodiment shown in FIG. 20 a layer of heat transfer media is placed between the tubing of the steam tracing and the outer surface of the mold.

As seen in FIG. 14, the peripheral ends of the tubing forming the arcuate segment 136 are plugged. Cylindrical nipples 156 and 158 extend radially outward from the tubing near its peripheral ends and are communicated with the interior of the tubing to allow a means of fluidly connecting adjacent segments of tubing as further described below.

Also, adjacent each of the peripheral ends 152 and 154 L-shaped angles are welded to the tubing and include outward radially outwardly extending mounting flanges 160 and 162.

In the embodiment illustrated, the arcuate segment 136 of upper loop 130A is structurally supported from the upper annular mold half 104 by the bracket assembly 120. The bracket assembly 120 also supports an arcuate segment of each of the other upper loops 130B, 130C, 130D and 130E as is best illustrated in the enlarged views of FIGS. 9 and 10. For each upper loop, however, each arcuate segment of that loop is separately structurally supported from the upper annular mold half 104. Thus, each of the arcuate segments 136, 138, 140 and 142 of upper loop 130A are separately structurally supported from the upper annular mold half 104 by bracket assemblies 120, 122, 124 and 126, respectively.

The primary component of the bracket assembly 120 is a mounting bracket 164 best seen in FIG. 11, which includes a vertical spine 166 and three pairs of mounting plates 168, 170 and 172.

The mounting assembly 120 is designed to be structurally connected to the upper mold half 104 in a manner which requires a minimal amount of modification of the upper annular mold half. In this case, the mounting bracket 164 is designed to be attached to the upper annular mold half 104 with two mounting studs 174 and 176 received through two mounting slots 178 and 180, respectively, defined in the spine 166 of mounting bracket 164.

Figure 10:
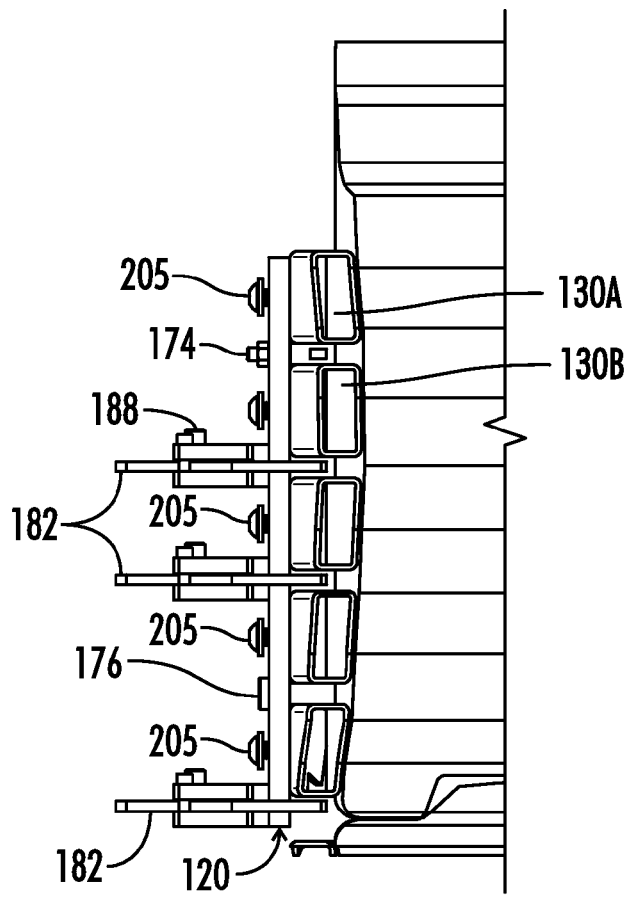
FIG. 10 is a partial elevation sectioned view taken along line 10-10 of FIG. 9 further illustrating the attachment of the steam tracings to the tire mold with the mounting bracket of FIG. 9.

The manner of assembly of the arcuate segment 136 and the four arcuate segments therebelow with the mounting bracket 120 as seen in FIGS. 9 and 10 will now be described.

First, the mounting bracket 164 is partially attached to the upper mold half 104 by placing the upper mounting stud 174 through slot 178 and engaging a threaded hole 218 (see FIG. 4) formed in the outer surface 108 of mold 104.

Then, the arcuate segment 136 of upper loop 130A is placed between the spine 166 of bracket 164 and the exterior surface 108 of upper mold half 104 and is rested on top of the mounting stud 174.

Then an arcuate segment of the upper loop 130B is inserted from below between the spine 166 of bracket 164 and the outer surface 108 of upper mold half 104 and is raised to substantially the position shown in FIGS. 9 and 10. Then a retaining tab 182 such as seen in FIG. 12 is inserted between the upper pair of mounting plates 168 so that it extends radially inward below the lower surface of the upper loop 130B as seen in FIG. 10.

The retainer tab 182 has a forked radially inner end 184 and a radially outer end 186. The forked inner end 184 is bifurcated and extends on either side of the spine 166 of mounting bracket 164 radially inward past the spine 166 so as to fit under the upper loop 130B on either side of spine 166 as best seen in FIG. 10. The retainer tab 182 may be held in place between the plates 168 by a spring loaded ball detent member 188.

Then in a similar fashion an arcuate segment of the third upper loop 130C is raised into place below the tab 182 and then a second one of the tabs 182 is placed in the pair of flanges 170 and extended under the third loop 130C. Then, an arcuate segment of the fourth loop 130D is raised up into place and the second mounting stud 176 is inserted through slot 180 and under the loop 130D and threaded into place into a threaded mounting hole 218 in the outer surface of the upper mold half 104. Then the final loop 130E is raised into place and a third mounting tab 182 is placed between the pair of mounting plates 172 and extended under the upper loop 130E.

All of the mounting tabs may utilize spring loaded ball detents 188 to hold them in place relative to their respective mounting plates.

In a similar fashion the other arcuate segments of each upper loop 130A-130E are structurally supported from the upper mold half 104 by the other mounting bracket assemblies 122, 124 and 126.

Adjacent peripheral ends of adjacent arcuate segments of each of the loops are structurally connected together as shown in FIG. 6. The circumferential lengths of the arcuate segments are selected so that when the four arcuate segments of a loop are mounted equally spaced around the circumference of the mold, there is a gap such as 190 between the peripheral ends of adjacent arcuate segments. A resilient structural connector 192 extends across the gap 190 and biases the arcuate segments circumferentially toward each other so that each upper loop is held in tension about the upper cylindrical outer surface 108 of upper mold half 104. The resilient structural connector 192 includes a bolt 194 extending from a bolt head 196 to a threaded end 198 with a nut 200 received on the threaded end 198.

A spacer 202 is received about the bolt 194 and is placed between the mounting flanges 160 and 162 to define the minimum dimension of the gap 190. A coiled spring 204 is received about the bolt 194 and located between the bolt head 196 and the mounting flange 160 so as to resiliently bias the flanges 160 and 162 circumferentially toward each other, while allowing the flanges to move some distance apart so that the gap 190 widens to accommodate thermal expansion of the mold 104. It is the springs 204 which provide the circumferential tension within the loop 130A.

After each of the arcuate segments has been properly placed in association with its respective mounting bracket assembly such as 120, the arcuate segments can be pushed firmly against the outer surface 108 of upper mold half 104 by set screws 205.

Figure 8:
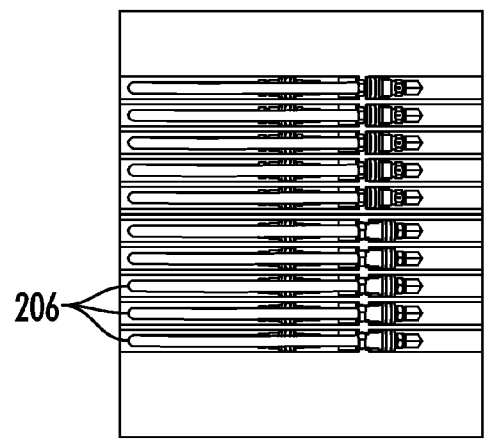
FIG. 8 is a partial elevation view of the apparatus of FIG. 5 taken along line 8-8 of FIG. 5 and illustrating the flexible hose connections between adjacent segments of each loop of the steam tracings.

As is best seen in FIGS. 5 and 8, adjacent arcuate segments of each loop are fluidly connected together by a flexible hose such as 206. For example in FIG. 6 and FIG. 5, the flexible hose 206 is shown connecting the arcuate segments 136 and 142 of upper loop 130A. A similar flexible hose connection is shown in FIG. 5 between arcuate segment 136 and arcuate segment 138, and another is shown between arcuate segment 140 and arcuate segment 142. In FIG. 5, however, the arcuate segments 138 and 140 are not directly fluidly connected together, but instead the arcuate segment 138 is fluidly connected by a flexible hose 208 to an arcuate segment of the next lower loop 130B lying immediately below the arcuate segment 140 of FIG. 5.

In this manner the multiple upper loops of upper steam tracing 118 are fluidly connected together in series such that steam entering for example the upper loop 130A will flow around the loop 130A then through hose 208 into the loop 130B, and then in a similar fashion around loop 130B and then into loop 130C, etc. The fluid connections between the loops can of course be made in any desired manner to provide any desired flow pattern of the steam through the steam tracing 118.

Similarly, the loops of lower steam tracing 128 are connected together. The lower steam tracing 128 can also be fluidly connected in series with the upper steam tracing 118, or they may be completely separately fluidly connected to a suitable steam source. If there are fluid connections between the upper steam tracing 118 and the lower steam tracing 128 they should be provided with a sufficient flexibility so as to allow the necessary separation of the upper and lower mold halves during operation of the mold.

As seen in FIG. 6, each of the flexible hoses is preferably connected to the fluid nipples 156 and 158 of the tubing via fluid quick connect couplings such as 210 and 212.

Figure 17:
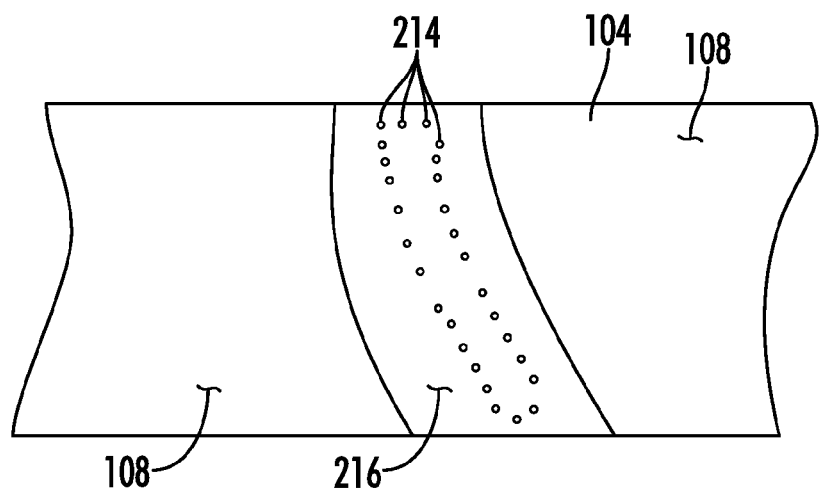
FIG. 17 is a schematic elevation illustration of a portion of one of the mold halves illustrating the presence of pin vent holes in the mold and the presence of a shallow groove formed in the exterior cylindrical surface of the mold to communicate the pin vents with the atmosphere.

As schematically illustrated in FIG. 17, each of the mold halves such as upper mold half 104 will have a large number of relatively small pin vent holes such as 214 extending from the inner cavity 112 to the outer cylindrical surface 108 to allow venting of the mold as the rubber portions of the tire are molded into the cavity. It is important that the upper steam tracing 118 not block these pin vent holes 214. To that end, the cylindrical outer surface 108 of upper mold half 104 should have a shallow recess such as 216 formed therein so as to join a plurality of the pin vent holes 214 together within a single recess 216 and to provide communication of those pin vent holes with some portion of the upper cylindrical outer surface 108 which is not covered by the upper steam tracing 118.

The tire molding apparatus 100 provides a number of advantages. Due to the relative small volume of the tracings there is no requirement for ASME certification as a pressure vessel. The steam tracings are of relatively low cost construction as compared to molds having integral steam chambers. The steam tracings may be removed for mold cleaning. Due to the modular construction, if one portion of the steam tracing is damaged, it can be repaired just by replacing the damages segment. The steam tracing is light weight and easy to handle.

Methods of Retrofitting

Although it is possible to manufacture the tire mold apparatus 100 as a complete new assembly at manufacture, the construction of apparatus 100 is particularly designed for the purpose of modifying a tire mold such as the mold 12 of FIGS. 1 and 3 originally constructed for use in a dome press to allow the modified mold in a platen press such as illustrated in FIG. 2.

Such a method of retrofitting can generally be described as attaching the upper steam tracing 118 to the upper cylindrical outer surface 108 of upper mold half 104, and attaching the lower steam tracing 128 to the lower cylindrical outer surface 110 of lower mold half 106. Each of the steam tracings includes multiple loops as described above.

Prior to attaching the steam tracings to their respective mold halves, any necessary recesses such as recess 216 illustrated in FIG. 17 should be formed in the cylindrical outer surfaces of the mold halves to ensure that any pin vent holes which would otherwise be covered by the steam tracings, are provided with a clear communication path after the attachment of the steam tracings.

Furthermore, prior to attaching the steam tracings to the mold halves, each mold half is preferably modified by drilling and threading a plurality of mounting holes 218 into its cylindrical surface, with the mounting holes being properly located to receive the mounting studs such as 174 and 176 shown in FIG. 10.

As previously described each loop of each steam tracing is assembled from a plurality of arcuate loop segments. Those segments can be first attached to the mold and then the arcuate segments of each loop structurally and fluidly connected together as described above. It is also possible to structurally connect the arcuate segments of each loop to form a complete loop and to then assemble the complete loop with four associated mounting bracket assemblies in generally the same manner as described above. The structural connection of adjacent loop segments includes structurally and resiliently connecting adjacent ends of adjacent loop segments of each loop together so that each loop is held in loop tension about the cylindrical outer surface of its associated mold half.

In the embodiment illustrated each arcuate loop segment of a given loop is separately structurally supported from the upper mold part by one of the mounting bracket assemblies.

After the loops of a steam tracing are structurally connected to the respective mold path, the adjacent segments of the loops are fluidly connected together, and adjacent loops are fluidly connected together as previously described. Also an insulation blanket (not shown) may be wrapped about the assembled steam tracing and mold half assemblies.

In the disclosed embodiment the steam tracings are formed from rectangular cross-section tubing arranged such that a radially innermost planar exterior tubing surface of each loop is placed in heat conducting contact with the cylindrical outer surface of its associated mold half. In the embodiment illustrated that radially innermost planar exterior tubing surface is directly engaged with the outer cylindrical surface without any heat conducting media therebetween.

Figure 18:
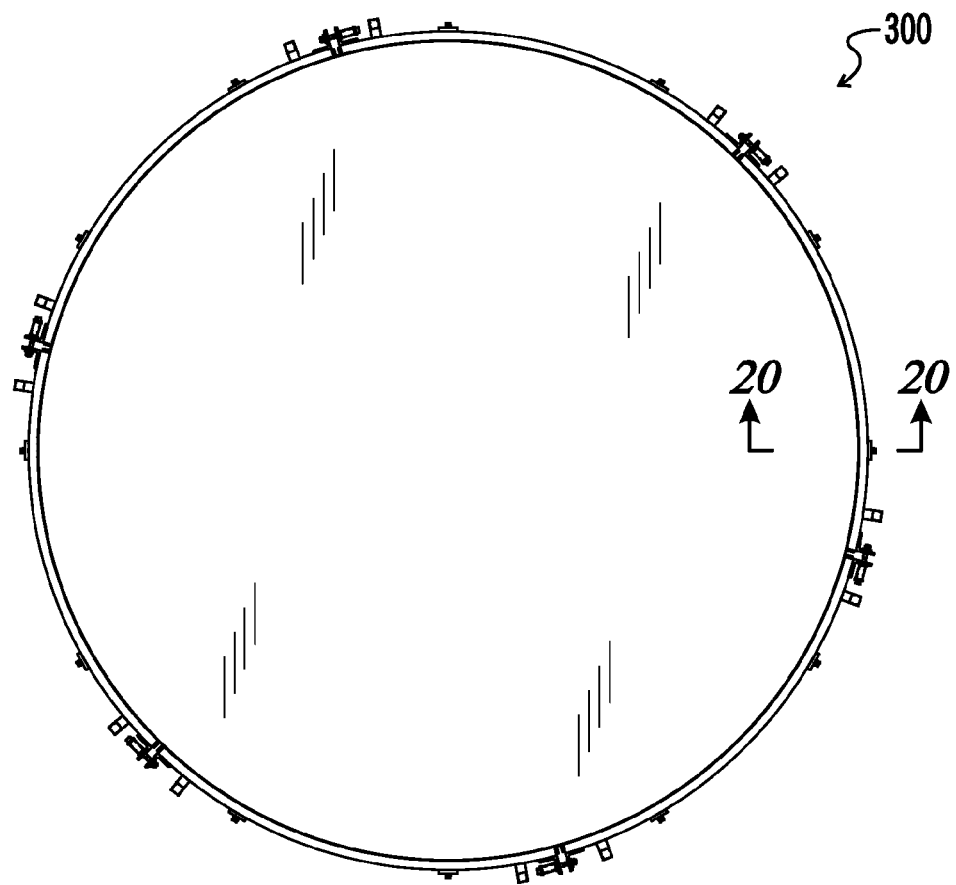
FIG. 18 is a plan view of an alternative embodiment for the mold tracings and their mounting on the tire mold.
Figure 19:
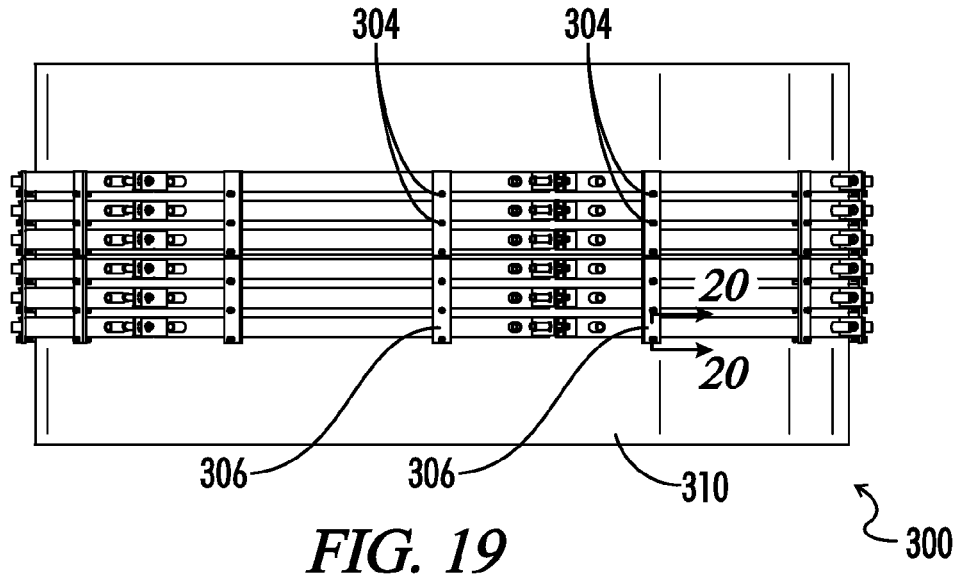
FIG. 19 is an elevation view of the embodiment of FIG. 18.
Figure 20:
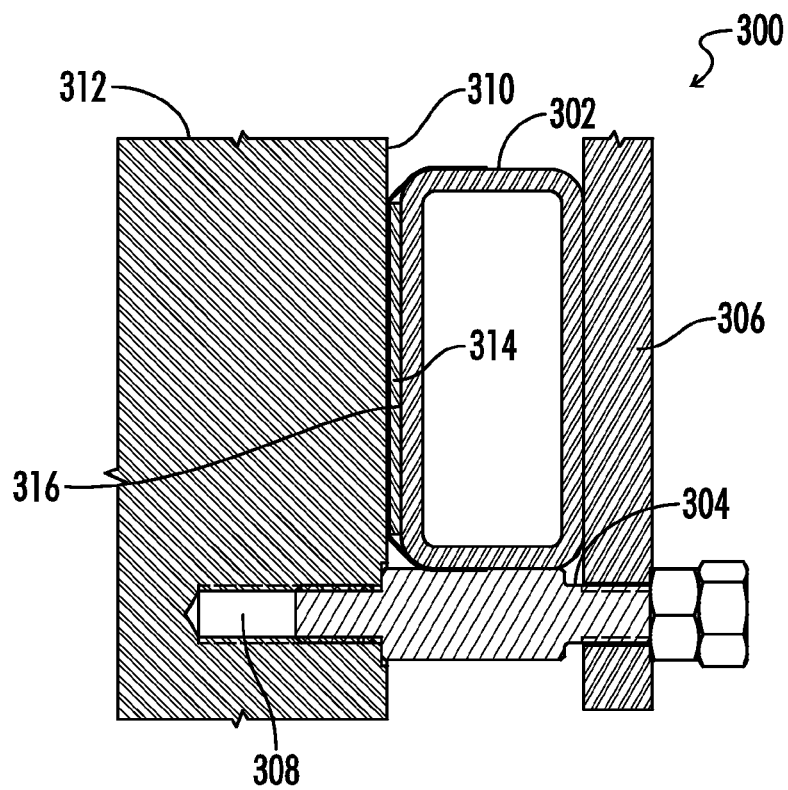
FIG. 20 is an enlarged section view showing the details of the mounting of the steam tracing to the tire mold of FIGS. 18 and 19.

Alternative Embodiment of FIGS. 18-20

FIG. 19 is an elevation view of an alternative tire mold apparatus generally designated by the numeral 300. The tire mold 300 of FIGS. 18-20 illustrates several possible modifications as compared to the tire mold apparatus 100 described above. A first modification is that each loop of each steam tracing is divided into six segments rather than four. A second modification is that each steam tracing in this case includes only three loops rather than the five loops of the apparatus 100. A third modification as best seen in the enlarged view of FIG. 20 is a different arrangement for mounting the steam tracings on the tire mold. A fourth modification is the use of heat transfer media between the tubing of the steam tracing and the outer surface of the tire mold.

Turning to the enlarged view of FIG. 20, each of the arcuate tubing segments such as 302 is supported at one or more circumferential positions on a mounting bolt 304 which extends through a vertical mounting strap 306 and into a threaded bore 308 formed in the cylindrical outer surface 310 of the mold half 312. A layer 314 of heat transfer media is placed on a radially innermost outer surface 316 of the arcuate tubing segment 302, and the mounting bolt 304 is used to pull the mounting strap 306 radially inward so as to tightly hold the arcuate segment 302 in heat conducting engagement with the outer surface 310 of mold half 312.

In a similar fashion, as best seen in FIG. 19, mounting bolts 304 extend through the mounting straps 306 adjacent and just below each of the loops of each steam tracing.

Structural and fluid connection of adjacent arcuate segments and of adjacent loops for the tire mold apparatus 300 are made in a similar fashion to that described above for the tire mold apparatus 100.

Figure 21:
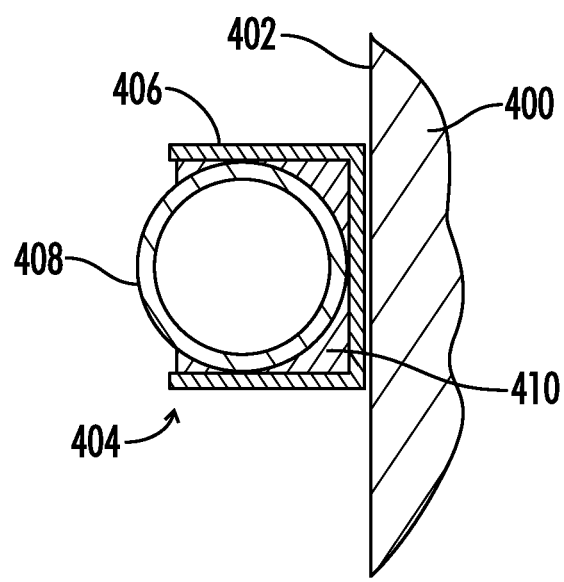
FIG. 21 is a schematic cross-section view of an alternative embodiment of the steam tracing.

Alternative Embodiment of FIG. 21

Turning now to FIG. 21, a schematic cross-sectioned view is shown of an alternative design for a steam tracing which instead of using the rectangular tubing of the apparatus 100 or apparatus 300, uses a circular cross-section tubing 408 held in place within a channel shaped support 406.

Thus, in FIG. 21 a mold half 400 has an exterior outer surface 402. An arcuate segment of a steam tracing loop is generally designed by the numeral 404 and is shown in cross-section. The arcuate segment 404 is made up of a channel shaped member 406 having a circular cross-section steam conducting tubing 408 received therein. Preferably a heat transfer media 410 fills in any gaps between the circular cross-section tubing 408 and the channel shaped carrier 406. The arcuate segments of the channel shaped carrier 406 may be structurally connected together in a manner generally like that shown in FIG. 6 using resilient structural connectors such as 192. The arcuate segments of circular cross-section tubing such as 408 may be fluidly connected together in a manner similar to the fluid connections described above for the rectangular cross-section tubing.

Figure 22:
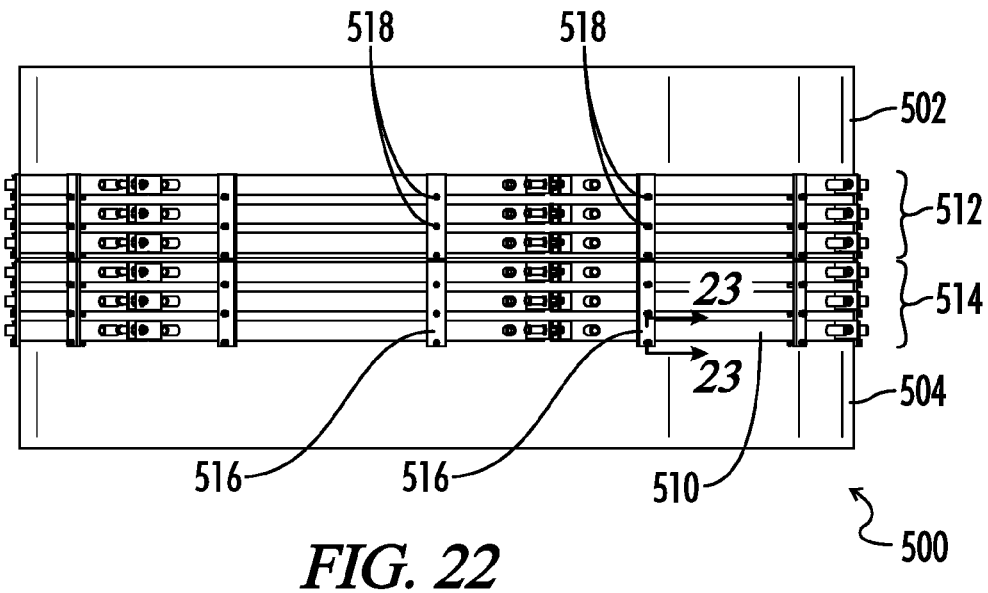
FIG. 22 is an elevation view of another alternative embodiment for the mounting of the steam tracings.
Figure 23:
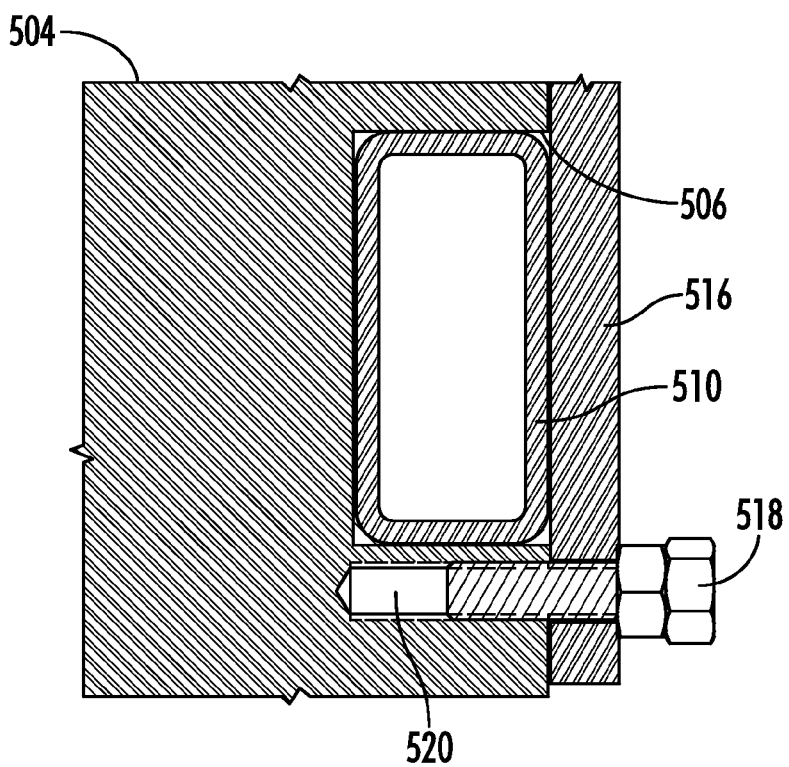
FIG. 23 is an enlarged sectioned view along line 23-23 of FIG. 22.

Alternative Embodiment of FIGS. 22-23

FIGS. 22-23 show an alternative embodiment in which the steam tracings are carried in grooves machined into the outer surface of the mold. In FIG. 22 an alternative tire molding apparatus 500 includes upper and lower mold halves 502 and 504. As best seen in FIG. 23, the cylindrical outer surfaces of each of the mold halves have a plurality of annular grooves such as 506 formed therein. The grooves may be formed by machining of the mold halves. The loops such as 510 of upper and lower steam tracings 512 and 514 are received in and supported by the grooves 506.

The loops may be held in place within their respective grooves by mounting straps such as 516 attached with bolts 518 received in threaded bores 520 formed in the cylindrical outer surfaces of the mold halves. If desired, heat transfer media may be placed between the loops and the grooves in which they are received.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A tire mold apparatus, comprising:
   a mold body including an upper annular mold half and a lower annular mold half, each mold half having a cylindrical outer surface, the mold halves constructed to fit together to define a mold cavity for molding a tire;
   an upper steam tracing including a plurality of upper loops surrounding the cylindrical outer surface of the upper annular mold half, the upper steam tracing being detachably mounted on the upper annular mold half;
   a lower steam tracing including a plurality of lower loops surrounding the cylindrical outer surface of the lower annular mold half, the lower steam tracing being detachably mounted on the lower annular mold half, so that the upper and lower annular mold halves can be separated with the steam tracings attached to the mold halves;
   wherein each upper loop of the upper steam tracing includes a plurality of arcuate segments of less than 360° joined together to form a 360° loop;
   wherein adjacent arcuate segments of each upper loop have a gap therebetween; and
   a resilient structural connector extending across the a and biasing the adjacent arcuate segments toward each other so that each upper loop is held in tension about the upper cylinder outer surface.

2. The apparatus of claim 1, wherein:
   each upper loop of the upper steam tracing includes a radially inner planar surface engaging the cylindrical outer surface of the upper annular mold half.

3. The apparatus of claim 2, wherein:
   each upper loop is formed from tubing having a rectangular cross-section.

4. The apparatus of claim 3, wherein:
   the rectangular cross-section tubing of each upper loop directly engages the cylindrical outer surface of the upper annular mold half with no heat transfer media between the tubing and the cylindrical outer surface.

5. The apparatus of claim 1, wherein:
   each arcuate segment is separately structurally supported from the upper annular mold half.

6. The apparatus of claim 1, further comprising:
   a plurality of flexible hoses, each hose fluidly connecting two adjacent segments of each upper loop.

7. The apparatus of claim 6, wherein:
   adjacent upper loops are fluidly connected together by a flexible hose.

8. The apparatus of claim 1, wherein the arcuate segments are of substantially equal length.

9. The apparatus of claim 1, wherein the upper loops are fluidly connected together in series.

10. A method of retrofitting a tire mold originally constructed for use in a dome press for use in a platen press, the tire mold including an upper mold part having an upper cylindrical outer surface and a lower mold part having a lower cylindrical outer surface, the method comprising:
    (a) attaching an upper steam tracing to the upper cylindrical outer surface, the upper steam tracing including multiple upper loops extending around the upper cylindrical outer surface, the attaching including;
       assembling each upper loop from a plurality of arcuate loop segments, wherein each loop segment has two ends; and
       structurally and resiliently connecting adjacent ends of adjacent loop segments of each upper loop together so that each upper loop is held in loop tension about the upper cylindrical outer surface; and
    (b) attaching a lower steam tracing to the lower cylindrical outer surface, the lower steam tracing including multiple lower loops extending around the lower cylindrical outer surface.

11. The method of claim 10, wherein the upper mold part includes a plurality of pin vent holes, the method further comprising:
    prior to step (a), forming a recess in the upper cylindrical outer surface joining a plurality of the pin vent holes and providing communication of the pin vent holes with a portion of the upper cylindrical outer surface not covered by the upper steam tracing in step (a).

12. The method of claim 10, further comprising:
    prior to step (a), drilling and threading a plurality of mounting holes in the upper cylindrical surface; and
    wherein step (a) further comprises attaching a plurality of mounting brackets to the mounting holes, and supporting the upper steam tracing from the mounting brackets.

13. The method of claim 10, wherein:
    step (a) further comprises supporting each loop segment of each upper loop separately from the upper mold part.

14. The method of claim 10, wherein:
    step (a) further comprises fluidly connecting adjacent segments of an upper loop with a flexible connecting conduit, and fluidly connecting adjacent upper loops with another flexible connecting conduit.

15. The method of claim 10, wherein:
    in step (a), the upper steam tracing is formed from rectangular cross-section tubing, and in step (a) a radially innermost planar exterior tubing surface of each upper loop is placed in heat conducting contact with the upper cylindrical outer surface.

16. The method of claim 15, wherein:
    in step (a), the radially innermost planar exterior tubing surface is directly engaged with the upper cylindrical outer surface without any heat conducting media therebetween.

* * * * *

UNITED STATES PATENT AND TRADEMARK OFFICE
CERTIFICATE OF CORRECTION

| | | |
|---|---|---|
| PATENT NO. | : 9,138,950 B2 | Page 1 of 1 |
| APPLICATION NO. | : 13/251319 | |
| DATED | : September 22, 2015 | |
| INVENTOR(S) | : Byers et al. | |

It is certified that error appears in the above-identified patent and that said Letters Patent is hereby corrected as shown below:

In the claims,

Column 9, line 39, second instance of "a" should be "gap"

Signed and Sealed this
Twenty-ninth Day of March, 2016

Michelle K. Lee
*Director of the United States Patent and Trademark Office*